US010728250B2

(12) United States Patent
Bartik et al.

(10) Patent No.: US 10,728,250 B2
(45) Date of Patent: Jul. 28, 2020

(54) MANAGING A WHITELIST OF INTERNET DOMAINS

(71) Applicant: International Business Machines Corporation, Armonk, NY (US)

(72) Inventors: Avishay Bartik, Negev Beer Sheeva (IL); Alon Freund, Maale Adumim (IL); Aviv Ron, Klachim (IL); Shahaf Stein, Rishon Letsiyon (IL)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 15/663,981

(22) Filed: Jul. 31, 2017

(65) Prior Publication Data

US 2019/0036930 A1   Jan. 31, 2019

(51) Int. Cl.
*G06F 21/00* (2013.01)
*H04L 29/06* (2006.01)
*G06F 16/951* (2019.01)
*H04L 29/08* (2006.01)
*G06F 21/57* (2013.01)

(52) U.S. Cl.
CPC .......... *H04L 63/101* (2013.01); *G06F 16/951* (2019.01); *G06F 21/577* (2013.01); *H04L 63/20* (2013.01); *H04L 67/02* (2013.01)

(58) Field of Classification Search
CPC ............................ H04L 63/101; G06F 16/951
USPC ...................................................... 726/26–30
See application file for complete search history.

(56) References Cited

U.S. PATENT DOCUMENTS

| 8,112,485 | B1 | 2/2012 | Cooley et al. | |
|---|---|---|---|---|
| 9,092,761 | B2 | 7/2015 | Wieneke et al. | |
| 9,171,152 | B1 | 10/2015 | Wilhelm et al. | |
| 2015/0082424 | A1 | 3/2015 | Shukla | |
| 2015/0180875 | A1* | 6/2015 | Kay | H04W 12/08 726/4 |
| 2016/0191548 | A1 | 6/2016 | Smith et al. | |
| 2016/0191598 | A1* | 6/2016 | DeFrancesco | G06Q 30/0277 709/219 |
| 2018/0052936 | A1* | 2/2018 | Cora | G06N 7/005 |

FOREIGN PATENT DOCUMENTS

| EP | 3007411 A1 | 4/2016 |
|---|---|---|
| WO | 2016118153 A1 | 7/2016 |

* cited by examiner

*Primary Examiner* — Anthony D Brown
(74) *Attorney, Agent, or Firm* — Michael A. Petrocelli

(57) ABSTRACT

Aspects of the present invention disclose a method, computer program product, and system for updating a whitelist. The method includes one or more processors identifying candidates for a whitelist based on correlations between candidates and web domains in the whitelist. The method further includes one or more processors extracting textual information and image information from the whitelist candidates. The method further includes one or more processors classifying the candidates for the whitelist into groups of candidates based on a comparison of the extracted information from the whitelist candidates and information associated with the web domains existing in the whitelist. The method further includes one or more processors determining candidates to add to the whitelist based upon a similarity measure ranking between the web domains existing in the whitelist and the candidates for a whitelist. The method further includes one or more processors updating the whitelist to include the determined candidates.

20 Claims, 3 Drawing Sheets

MANAGING A WHITELIST OF INTERNET DOMAINS

BACKGROUND

The present invention relates generally to the field of network environments and more particularly to network security.

A whitelist is a list of entities approved for authorized access or privileged membership to enter a specific area in the computing world. These entities could include electronic groups or organizations, privileged websites or even email addresses. Whitelist may also refer to an actionable promotion or recognition of an organization, group, or individual. This term may also be known as an approved list.

Internet service providers employ whitelists to protect their customers. There are various types of whitelists, including commercial, noncommercial, local area network (LAN), program, and application whitelists. Rather than blacklisting harmful websites, whitelisting is considered to be a proactive measure. Whitelisting is used to allow access to pertinent and safe websites, which may be considered an alternative to the use of anti-malware software.

Regarding emails, a whitelist includes email addresses that are considered acceptable and are therefore not filtered out. Likewise, application whitelists are considered a protective measure to allow only safe applications that do not compromise computer functions or security.

Organizational whitelists are used to make sure that institutions, such as public schools, protect their students against harmful websites. These organizations may allow, or whitelist, only those sites that promote organizational goals, such as those that assist students with classroom assignments.

Commercial whitelists are used to ensure that advertisers are successfully delivering content to their preferred customers. Noncommercial whitelists may also be generated by nonprofit organizations. Blacklist is the opposite of whitelist and refers to a list of entities that are denied, ostracized, or unrecognized for access to the computing world.

A blacklist, or block list, is a basic access control mechanism that allows through all elements (email addresses, users, passwords, URLs, IP addresses, domain names, file hashes, etc.), except those explicitly mentioned. Those items on the list are denied access. The opposite is a whitelist, which means only items on the list are let through whatever gate is being used. A greylist contains items that are temporarily blocked (or temporarily allowed) until an additional step is performed.

Blacklists can be applied at various points in a security architecture, such as a host, web proxy, DNS servers, email server, firewall, directory servers, or application authentication gateways. The type of element blocked is influenced by the access control location. DNS servers may be well-suited to block domain names, for example, but not URLs. A firewall is well-suited for blocking IP addresses but less so for blocking malicious files or passwords. Example uses include a company that might prevent a list of software from running on its network, a school that might prevent access to a list of web sites from its computers, or a business that wants to ensure their computer users are not choosing easily guessed, poor passwords.

SUMMARY

According to one embodiment of the present invention, a method for updating a whitelist is provided. The method for updating a whitelist may include one or more processors identifying candidates for a whitelist based on correlations between candidates and web domains existing in the whitelist. The method further includes one or more processors extracting information from the candidates for the whitelist, and the extracted information includes textual information and image information. The method further includes one or more processors classifying the candidates for the whitelist into one or more groups of candidates based on a comparison of the extracted information from the candidates for the whitelist and information associated with the web domains existing in the whitelist. The method further includes one or more processors determining one or more groups of candidates to add to the whitelist based upon a similarity measure ranking between the web domains existing in the whitelist and the candidates for a whitelist. The method further includes one or more processors updating the whitelist to include the determined one or more groups of candidates.

DETAILED DESCRIPTION

Embodiments of the present invention recognize that current common computer services, that are used for filtering web domains and uniform resource locators (URLs), apply heuristics to avoid malicious web activities from being accessed by end users. Current common computer services improve filtering, one of the measures which the common computer services by reducing the false positive ratio that occurs when separating legitimate domains and URLS from the domains and URLS classified as malicious, by using a whitelist.

Embodiments of the present invention recognize that new domains and URLs emerge rapidly which increases the difficulty to maintain an accurate up-to-date whitelist. Embodiments of the present invention recognize that failure to maintain an updated whitelist can result in the filtering and lack of access to legitimate domains and URLs or a false positive classification.

Embodiments of the present invention provide a method for automatically creating and maintaining a whitelist. The current invention provides the ability to find new domains and URLs that have the potential to be part of the whitelist, analyze the content in the new domains and URLs, evaluate a correlation with existing domains and URLs, which are in the basic whitelist, and update the whitelist with new domains and URLs.

Figure 1:
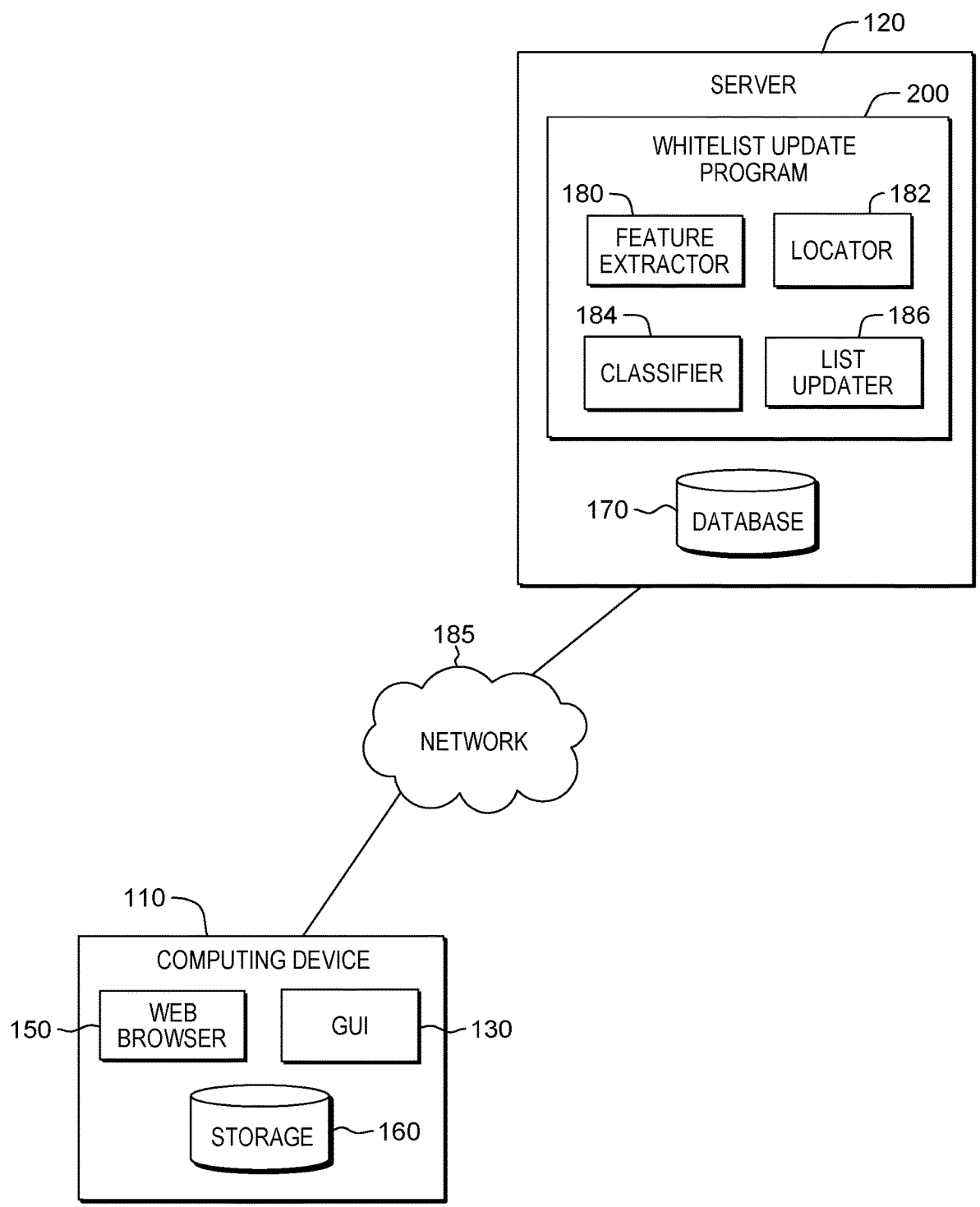
FIG. 1 is a functional block diagram illustrating a distributed data processing environment, in accordance with an embodiment of the present invention.

Example embodiments, in accordance with the present invention, will now be described in detail with reference to the Figures. FIG. 1 is a functional block diagram, illustrating a distributed data processing environment. The distributed data processing environment includes computing device 110, server computer 120, interconnected over network 185.

In one embodiment, computing device 110 includes graphical user interface (GUI) 130, web browser 150, and storage 160. The various programs on computing device 110 include a web browser, an electronic mail client, security software (e.g., a firewall program, a geo-locating program, an encryption program, etc.), an instant messaging (IM) application (app), and a communication (e.g., phone) application.

Computing device 110 may be a desktop computer, a laptop computer, a tablet computer, a specialized computer server, a smartphone, a wearable device (e.g., smart watch, personal fitness device, personal safety device), or any programmable computer system known in the art with an interactive display or any other computer system known in the art. In certain embodiments, computing device 110 represents a computer system utilizing clustered computers and components that act as a single pool of seamless resources when accessed through network 185, as is common in data centers and with cloud computing applications. In general, computing device 110 is representative of any programmable electronic device or combination of programmable electronic devices capable of executing machine-readable program instructions and communicating with other computer devices via a network.

In one embodiment, graphical user interface 130 operates on computing device 110. In another embodiment, graphical user interface 130 operates on another computer in a server based setting, for example on a server computer (e.g., server 120). In yet another embodiment, graphical user interface 130 operates on computing device 110 simultaneously with a server computer interconnected through network 185 (e.g., server 120). Graphical user interface 130 may be any user interface used to access information from computing device 110, such as information gathered or produced by whitelist update program 200. Additionally, graphical user interface 130 may be any user interface used to supply information to computing device 110, such as information supplied by a user to be used by whitelist update program 200. In some embodiments, graphical user interface 130 may present a generic web browser used to retrieve, present, and negotiate resources from the Internet. In other embodiments, graphical user interface 130 may be a software or application that enables a user at computing device 110 access to network 185.

In yet another embodiment, a user of computing device 110 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., a web browser) can generate graphical user interface 130 operating within the GUI of computing device 110. Graphical user interface 130 accepts input from a plurality of input/output (I/O) devices including, but not limited to, a tactile sensor interface (e.g., a touch screen or a touchpad) referred to as a multi-touch display. An I/O device interfacing with graphical user interface 130 may be connected to computing device 110, which may operate utilizing wired (e.g., USB port) or wireless network communications (e.g., infrared, NFC, etc.). Computing device 110 may include components, as depicted and described in further detail with respect to FIG. 3, in accordance with embodiments of the present invention.

Web browser 150 may be a generic web browser used to retrieve, present, and traverse information resources from the Internet. In some embodiments, web browser 150 may be a web browser designed for a mobile device. In other embodiments, web browser 150 may be a web browser designed for a traditional computing device, such as a desktop computer, PC, or laptop. In general, web browser 150 may be any application or software that enables a user of computing device 110 to access a webpage over network 185. In the depicted environment, web browser 150 resides on computing device 110. In other embodiments, web browser 150, or similar web browsers, may reside on other computing devices capable of accessing a webpage over network 185.

Storage 160 (e.g., a database) located on computing device 110, represents any type of storage device capable of storing data that is accessed and utilized by computing device 110. In other embodiments, storage 160 represents multiple storage devices within computing device 110. Storage 160 stores information such as, but not limited to, account information, credentials for authentication, user preferences, lists of preferred users, previously visited websites, history of visited Wi-Fi portals, and the history of the location of the computing device.

In general, network 185 can be any combination of connections and protocols that will support communications among computing device 110. Network 185 can include, for example, a local area network (LAN), a wide area network (WAN), such as the Internet, a cellular network, or any combination of the preceding, and can further include wired, wireless, and/or fiber optic connections.

Server 120 may be a desktop computer, a laptop computer, a tablet computer, a specialized computer server, a smartphone, or any other computer system known in the art. In certain embodiments, server 120 represents a computer system utilizing clustered computers and components that act as a single pool of seamless resources when accessed through network 185, as is common in data centers and with cloud computing applications. In general, server 120 is representative of any programmable electronic device or combination of programmable electronic devices capable of executing machine-readable program instructions and communicating with other computer devices via a network. In one embodiment, server 120 includes database 170, feature extractor 180, locator 182, classifier 184, list updater 186, and whitelist update program 200.

In an embodiment, server 120 is capable of initiating a handshake process between server 120 and computing device 110. Handshaking is an automated process of negotiation that dynamically sets parameters of a communications channel established between two entities before normal communication over the channel begins. Handshaking follows the physical establishment of the channel and precedes normal information transfer. Handshaking facilitates connecting heterogeneous computing systems, or equipment, over a communication channel without the need for user intervention to set parameters. In an example, server 120 initiates the handshake process by sending a message to computing device 110 indicating that server 120 wants to establish a communication channel in order to gain access to programs on computing device 110.

Feature extractor 180 (a subprogram of whitelist update program 200) is an advanced natural language processor driven sub program designed to retrieve syntactic information from whitelist candidate sites and look for a correlation between whitelist candidates and domains in the whitelist. Whitelist candidate sites can be security environments such as domains, reputation systems firewalls, and anti-malware software. In general, feature extractor 180 accesses a whitelist candidate site to identify and compare whitelist candidates with domains in the whitelist and analyze text using the concept unique identifier. A concept unique identifier is a sub program of feature extractor 180 that selects and extracts the unique concept from the entirety of the text. The unique concept is the longest, complete phrase that has been identified as having a correlation between the whitelist candidate and domains in the whitelist. For example, feature extractor 180, utilizing the concept unique identifier in consultation with database 170, selects the whitelist candidate from the text, and analyzes the text in conjunction with the entirety of the text. Feature extractor 180, utilizing concept unique identifier is able to determine, through accessing database 170, that text in a whitelist candidate has, or does not have an analog in the domain on the whitelist.

In another embodiment, feature extractor 180 uses an image comparison algorithm to extract and compare screenshots and images. In an example, feature extractor 180 performs a color histogram comparison to identify correlations between the whitelist candidate and domains in the whitelist. In another example, feature extractor 180 utilizes a keypoint matching algorithm to identify correlations between the whitelist candidate and domains in the whitelist.

Locator 182 (a subprogram of whitelist update program 200) enables whitelist update program 200 to find and locate new domains and URLs that are candidates for the whitelist. In an embodiment, locater 182 utilizes a web crawler sub program to systematically browse the World Wide Web. Locater 182, through the web crawler sub program, validates hyperlinks and Hyper Text Markup Language (HTML) code. In an example, locater 182, through web crawler sub program, formulates a list of URLs, or seeds, to visit. Locator 182, through the web crawler sub program, identifies all hyperlinks in the page and adds the hyperlinks to another list of URLs to visit (e.g., a crawl frontier) at a later time. Locater 182 is capable of archiving visited websites, in database 170, and saving information. The files are stored in database 170 such that whitelist update program 200 can view, analyze, and navigate the previously visited pages.

In an embodiment, locater 182 utilizes a search engine to search for keywords and brand names taken from the initial whitelist. In this example, locator 182 recognizes that malicious domains and URLs have a short lifespan so malicious domains and URLs will not be part of a search engine's top results.

In another embodiment, locater 182 utilizes a reverse WHOIS query to locate new domains and whitelists. In an example, locator 182 begins with a trusted domain and URL from an initial whitelist and retrieves the reverse WHOIS record that contains every domain that was registered by the same owner.

Classifier 184 (a subprogram of whitelist update program 200) directs the classification process. In an embodiment, classifier 184 directs the process of defining whether a candidate domain or URL is owned by the same owner of one of the domains and URLs that are in the initial whitelist. Classifier 184 activates and performs the classification process using static rules. In an example, classifier 184 analyzes email addresses in the WHOIS records for a match. In another embodiment, classifier 184 utilizes a machine learning classification algorithm to predict if two sites have the same ownership based on a match probability.

List updater 186 enriches the whitelist. In an embodiment, list updater 186 updates the initial whitelist by adding the domains and URLs that were classified, by sub program classifier 184, as benign and suitable to whitelist.

In one embodiment, whitelist update program 200 operates on server 120. In another embodiment, whitelist update program 200 operates on another computer in a server based setting, for example on a server computer not shown. In yet another embodiment, whitelist update program 200 operates on computing device 110 simultaneously with server 120 interconnected through network 185. Whitelist update program 200 provides the capability to automatically create and maintain a whitelist. Whitelist update program 200 is capable of utilizing Wi-Fi technology, Bluetooth, Near Field Communication tags (NFC), Global System for Mobile Communications (GSM), and Global Positioning System Technology (GPS) to communicate with computing device 110.

In an example embodiment, whitelist update program 200 operates as a code snippet within one or more applications on computing device 110. Code snippets define the scope of interactivity between the snippets and the application, (e.g., whitelist update program 200 hosted by a web browser application on server 120). For example, whitelist update program 200 is a function within web browser 150, and the processes of whitelist update program 200 occur automatically (i.e., without user intervention) during operation of web browser 150 as initiated by whitelist update program 200. The dynamic code snippet elements provide scripting support. The variables enable dialog between whitelist update program 200, through server 120, graphical user interface 130, and web browser 150.

In one embodiment, whitelist update program 200 has the ability to access computing device 110 to automatically maintain a domain and URL whitelist through accessing web browser 150. In an example, whitelist update program 200, utilizing locator 182, finds new domains and URLs that have a potential to be part of the whitelist. In this example, whitelist update program 200, through feature extractor 180, analyzes the content and metadata of domains and URLs on web browser 150. Whitelist update program 200 evaluates, through classifier 184, the correlation of the analyzed domains and URLs with existing domains and URLs.

In another embodiment, whitelist update program 200, utilizing list updater 186, has the ability to enrich and update the whitelist with new domains and URLs. In an example, whitelist update program 200, updates the initial whitelist by adding the domains and URLs that were classified as benign or malicious to the whitelist.

Figure 2:
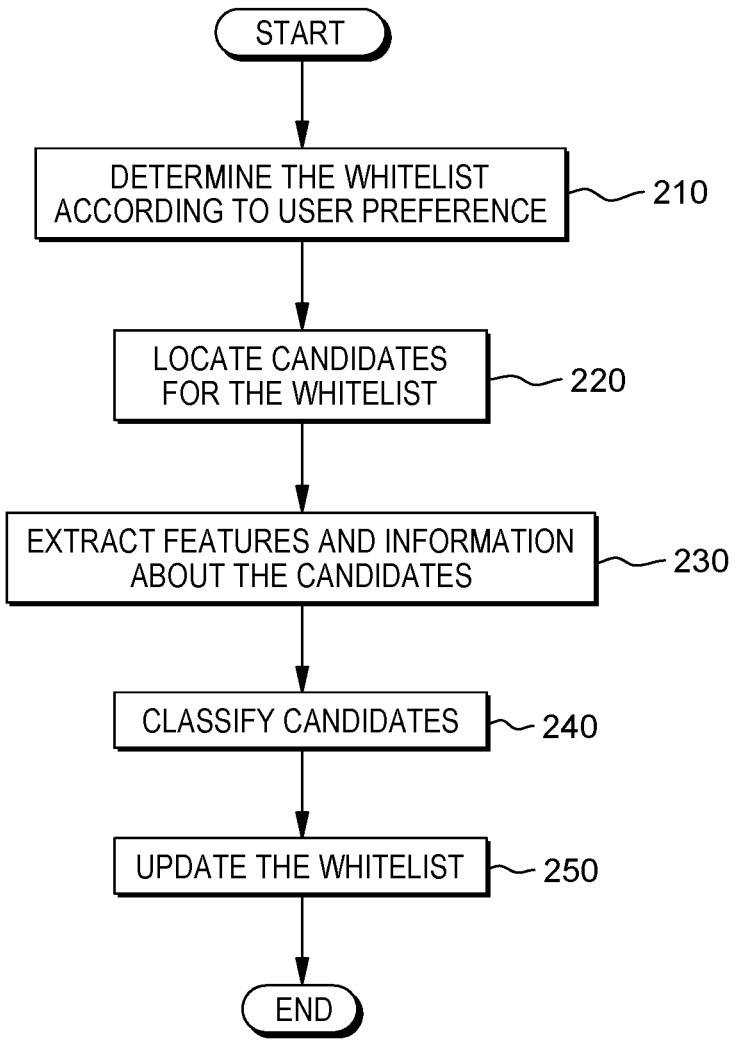
FIG. 2 is a flowchart depicting operational steps of a program for automatically creating and maintaining a whitelist, in accordance with the present invention.

FIG. 2 is a flowchart depicting the operational steps of whitelist update program 200, a program for automatically creating and updating whitelists, in accordance with an embodiment of the present invention.

In step 210, whitelist update program 200 determines the whitelist according to user preferences. In an embodiment, whitelist update program 200 may initiate in response to whitelist update program 200 receiving input from a user defining user preferences. User preferences include a time period that whitelist update program 200 activates to update the whitelist; a definition of programs, devices, and applications that use the whitelist; and whether to manually build a whitelist or allow whitelist update program 200 to build and maintain the whitelist. For example, whitelist update program 200 may receive input defining a user preferences indicating that the user wants to create or allow whitelist update program 200 to create a whitelist for email clients; for whitelist update program 200 to create a LAN whitelist and a program whitelist; while not permitting whitelist program 200 to create a commercial whitelist.

In an embodiment, whitelist update program 200 receives user preferences that specify the time period for activating and updating the whitelist. In this example, a user preference is whitelist update program 200 refreshing and updating domains and URLs on the current whitelist, on web browser 150, every hour on the hour.

In another embodiment, whitelist update program 200 automatically builds and updates the whitelist. In this example, whitelist update program 200, through accessing database 170 and storage 160 on computing device 110, builds a list of approved applications based on the history and frequency that a user has visited websites, and by analyzing, through web browser 150, a URL for potential malware. Whitelist update program 200, through automatically assessing user preferences, builds a list of applications that cannot be used within an enterprise network. Whitelist update program 200 tracks what application can, and cannot, be used within the enterprise network.

In step 220, whitelist update program 200 locates candidates for the whitelist. In an embodiment, whitelist update program 200 finds and locates new domains and URLs that are potential candidates for the whitelist. In an example, locator 182 utilizes a search engine to search for keywords and brand names taken from the initial whitelist.

In another example, whitelist update program 200, utilizing locater 182, accesses a popular search engine. Whitelist update program 200 analyzes millions of webpages in the search engine database to find candidates to add to the whitelist based upon the match to the initial query that the search engine returns. Whitelist update program 200 determines that the returned candidate is suitable for addition to the whitelist based upon locater 182 analyzing and sorting the results based upon the candidates ranking in order of relevancy. In this example, whitelist update program 200 assigns a higher relevancy to higher ranked candidates, based upon locater 182 tagging the candidates and whitelist update program 200 determining that the higher ranked candidates as more suitable for addition to the whitelist than the lower ranked or unranked candidates.

In another embodiment, locator 182 utilizes a reverse WHOIS query to locate new domains, email addresses, and whitelists. In an example, whitelist update program 200, through locator 182, begins with trusted domains from an initial whitelist and accesses reverse WHOIS records associated with the trusted domains from the whitelist. A reverse WHOIS record can contain a plurality of domains, or Internet Protocol Address (IP), which are registered by a common owner. In this example, whitelist update program 200, through classifier 184, is unable to access the contact details of the domain owner because whitelist update program 200 assesses, based upon the lack of available information in the public WHOIS database, that the domain owner opted for private registration to hide their contact details. Whitelist update program 200 performs, based upon the available options, a reverse IP look up to determine the address of the server that is hosting the website. Whitelist update program 200 analyzes the domain and determines that if a person owns multiple websites that they could be using the same web server to host the multiple websites. Whitelist update program 200, through locator 182, receives a small list of domains in the reverse IP search results. Whitelist update program 200 analyzes the results and assigns a high probability, using classifier 184, that the domain owner is the owner of the domain of interest and that the domain owner is not using a shared host. Whitelist update program 200 prioritizes the results of the reverse IP look up as suitable for addition to the whitelist based upon the small number of returned results. In this example, whitelist update program 200 can determine that, based upon the large number of results returned in the reverse IP look up, the probability that owner of the domain of interest is the owner of all the domains returned in the search results is low.

In another example, whitelist update program 200 locates a list of domains by querying a WHOIS database. A list of email addresses, which have been used to register at least one previously whitelisted domain, was created. Whitelist update program 200 employs the reverse WHOIS, using the list of email addresses located, to expand the original domain list. Whitelist update program 200 analyzes the labeled domains and email addresses and traces the labeled domains and email addresses to a semantic network library and determines, based on the retrieved information, that the groupings of domains that share a registrant contact email address are known whitelisted domains. In this example, whitelist update program 200 identifies information associated with a domain owner of a domain that is currently in the whitelist (e.g., name, email address, address, etc.). Whitelist update program 200 performs reverse WHOIS search to find domains that are associated with information that matches the information that is associated with the domain owner. For example, whitelist update program 200 identifies that the domain owner has email address johnsmith@example.com. In this example, whitelist update program 200 performs a reverse WHOIS search to identify domains that are also associated with the email address johnsmith@example.com. Whitelist update program 200 can determine that the domains that are also associated with the email address are candidates for addition to the whitelist.

In another embodiment, locator 182 analyzes existing whitelisted domains and URLs to find and locate new domains and URLs as candidates for the whitelist. In this example, locator 182, as a sub program of whitelist update program 200, uses trusted domains and URLs from the initial whitelist to analyze the site to find links which are connected to external domains and URLs.

In an example embodiment, locator 182, through the sub program, validates Hyper Text Markup Language (HTML) code. In an example, locater 182, through web crawler sub program, formulates a list of URLs taken from a whitelist on database 170, to visit. Based on user preferences, locator 182, through the web crawler, seeks out HTML pages and avoids all other Multipurpose Internet Mail Extensions (MIME) types. Locater 182 utilizes database 170 to create a list of HTML pages to visit from a whitelist. Locater 182 makes a Hypertext Transfer Protocol (HTTP HEAD) request to the whitelisted websites to determine a web resources' MIME type before requesting the entire resource with a GET request. A GET request is an HTTP method for a request response between a client and server. Locater 182, through web crawler sub program, examines the URL and only requests a web resource if the URL ends with certain characters, such as .html, .htm, .asp, .php, .jsp, .jspx, or a slash.

In another embodiment, locator 182, through web crawler sub program, is able to find and locate new URLs that are candidates for the whitelist from external source candidates. In this example, locator 182, through the web crawler, uses the whitelisted websites to identify all hyperlinks located on the websites on the whitelisted page and adds the hyperlinks to another list of URLs to analyze as potential whitelist candidates (e.g., a crawl frontier) at a later time. Locater 182 is capable of archiving visited websites, in database 170, and saving information from the websites. The files are stored in database 170 such that whitelist update program 200 can view, analyze, and navigate the previously visited pages. Locater 182 receives information in this process, later utilized by classifier 184, that suggests the hyperlinks are highly suitable for the whitelist based on their affiliation with already whitelisted webpages and URLs.

In step 230, whitelist update program 200 extracts features and information about the candidates. In one embodiment, feature extractor 180 accesses a whitelist candidate site (located in step 220) to identify and evaluate information located on the whitelist candidate site. Feature extractor 180 compares the whitelist candidates with domains that are already located in the whitelist. Feature extractor 180 analyzes textual information in the whitelist candidate site, and feature extractor 180 analyzes the whitelist candidate site for the absence or presence of hyperlinks. Feature extractor 180 analyzes the whitelist candidate site for other components using the concept unique identifier. A concept unique identifier is a sub program of feature extractor 180 that selects and extracts the unique concept from the entirety of the text. The unique concept is the longest, complete phrase that has been identified as having a correlation between the whitelist candidate and domains in the whitelist. For example, feature extractor 180, utilizing the concept unique identifier in consultation with database 170, selects text from the whitelist candidate and analyzes the text in conjunction with the entirety of the text. Feature extractor 180, utilizing concept unique identifier is able to determine, through accessing database 170, that text in a whitelist candidate has, or does not have, an analog in the domain on the whitelist.

In another embodiment, feature extractor 180 uses an image comparison algorithm to extract and compare screenshots and images. In an example, feature extractor 180 performs a color histogram comparison to identify correlations between the whitelist candidate and domains in the whitelist. In another example, feature extractor 180 utilizes a keypoint matching algorithm to identify correlations between the whitelist candidate and domains in the whitelist.

Feature extractor 180 can utilize a raw text reader and markable reader to detect sentences. The markable reader is the entity recognizer that discovers groups of textual mentions between domains and URLs in the whitelist and possible candidates for the whitelist that belong to a semantic class and have a high probability of being related. Comprehensively, feature extractor 180 employs a tokenizer, tagger, and word dependency parser to determine and separate sentences and phrases of that are identically cross listed between multiple domains and URLs from sentences and phrases that are not cross listed between multiple domains and URLs.

In step 240, whitelist update program 200 classifies candidates. In an embodiment, whitelist update program 200, through classifier 184, determines whether a candidate domain or URL is owned by the same owner of one of the domains and URLs that are in the initial whitelist based upon the information and features derived from step 230. Classifier 184 activates and performs the classification process using static rules. In an example, classifier 184 analyzes email addresses in the WHOIS records for a match.

In another embodiment, classifier 184 utilizes a machine learning classification algorithm to predict if two URLs, related to an original URL, have the same ownership based on a match probability that is determined by a machine learning algorithm. For example, whitelist update program 200, operating on web browser 150, utilizes a natural language processing driven sub program, not shown, to extract and classify words that are common to the original URL and multiple related URLs. In this example, whitelist update program 200, utilizing a raw text reader sub program in conjunction with a markable reader sub program, detects words and sentences that are similar across the original and multiple URLs.

In another embodiment, whitelist update program 200 utilizes an instance based learning algorithm, such as k-nearest neighbor algorithm, to compare a known whitelisted URL with URLs that share similar elements. Whitelist update program 200 constructs the hypothesis that the similar elements in the other, non-original URLs, are classified as suitable for the whitelist through using the original URL as a training instance. The complexity of whitelist update program 200's hypothesis, classifying the URL derivatives as suitable for the whitelist or not, grows with more instances of the elements of the URL found by locater 182. As discussed previously, classifier 184 utilizes information ascertained in step 220 in the classification of URLs. In this example, classifier 184 uses the information that locator 182 assessed in identifying www.ibmpatents.com as a candidate for the whitelist. Whitelist update program 200 stores the original URL in database 170 and uses this information to predict whether domains that share elements of the originally whitelisted URL should be classified as suitable for the whitelist.

Whitelist update program 200 classifies the original URL, and the multiple URLs that whitelist update program 200 determines are connected to the initially procured, original, whitelisted URL, has the same ownership and is whitelisted. As discussed in step 220, whitelist update program 200 classifies candidates based upon the initial assessment of the candidate as being a suitable candidate for the whitelist. Candidates that locator 182 determined as being suitable for the whitelist have a very high probability of being classified as suitable for the whitelist. Classifier 184 uses the original, whitelisted URL, and assigns a similarity measure ranking to derivative URLs that share elements of the original URL in deciding the derivative URLs classification status as suitable for the whitelist.

In step 250, whitelist update program 200 updates the whitelist. Whitelist update program 200 operates constantly and updates the whitelist periodically. In one embodiment, list updater 186 updates the initial whitelist by adding the domains and URLs that were classified, by sub program classifier 184, as suitable for addition to the whitelist. In an embodiment, whitelist update program 200 adds a list of URLs to the whitelist that whitelist update program 200, through classifier 184, determines are suitable for addition to the whitelist. Whitelist update program 200 utilizes the information and features derived in step 230, with the classification as designated in step 240, to automatically (e.g., without user intervention) update the whitelist based on user preferences from step 210. In this example, whitelist update program 200 updates the whitelist every 5 calendar days based upon the information extracted from step 230 and step 240.

Figure 3:
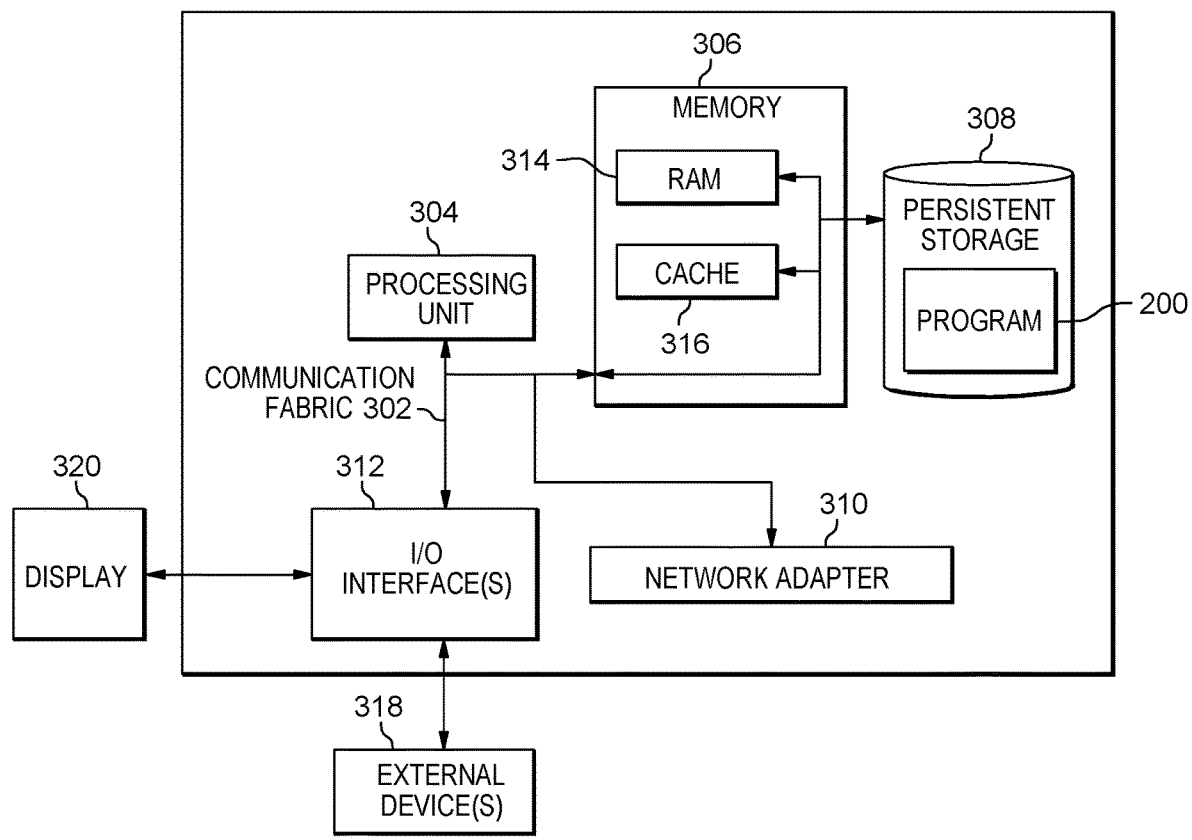
FIG. 3 is a block diagram of components of a computer system, such as the server computer of FIG. 1, in accordance with an embodiment of the present invention.

FIG. 3 depicts a block diagram of components of server 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 120 includes communications fabric 302, which provides communications between cache 316, memory 306, persistent storage 308, network adapter 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Whitelist update program 200 may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Network adapter 310, in these examples, provides for communications with other data processing systems or devices. In these examples, network adapter 310 includes one or more network interface cards. Network adapter 310 may provide communications through the use of either or both physical and wireless communications links. Whitelist update program 200 may be downloaded to persistent storage 308 through network adapter 310.

I/O interface(s) 312 allows for input and output of data with other devices that may be connected to server computer 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for updating a whitelist, the method comprising:

identifying, by one or more processors, candidates for a whitelist based on correlations between candidates and web domains existing in the whitelist;

extracting, by one or more processes, information from the candidates for the whitelist, wherein the extracted information includes textual information and image information;

classifying, by one or more processors, the candidates for the whitelist into one or more groups of candidates based on a comparison of the extracted information from the candidates for the whitelist and information associated with the web domains existing in the whitelist;

determining, by one or more processors, one or more groups of candidates to add to the whitelist based upon a similarity measure ranking between the web domains existing in the whitelist and the candidates for a whitelist;

the determining the one or more groups of candidates to add to the whitelist including:

finding and locating new domains and URLs that are candidates for the whitelist using a whitelist update program enabled by a locator subprogram of the whitelist update program, as part of the determining the one or more groups of candidates to add to the whitelist;

systematically browsing the World Wide Web using a web crawler sub program of the locator;

validating hyperlinks and Hyper Text Markup Language (HTML) code using the web crawler sub program of the locator;

storing visited websites in a database using the locator;

analyzing the previously visited pages using the whitelist update program accessing the database, using one or more processors, as part of the determining the one or more groups of candidates to add to the whitelist; and updating, by one or more processors, the whitelist to include the determined one or more groups of candidates.

2. The method of claim 1, wherein the identified candidates for the whitelist are candidates selected from the group consisting of:

an email address list, a domain name representing an internet protocol resource list, a media access control address list, and a local area network list.

3. The method of claim 1, wherein identifying candidates for the whitelist further comprises:

identifying, by one or more processors, an owner associated with a web domain existing in the whitelist; and identifying, by one or more processors, a web domain that is associated with the owner that is associated with the web domain existing in the whitelist.

4. The method of claim 1, wherein identifying candidates for the whitelist further comprises:

identifying, by one or more processors, information associated with a registered owner of a web domain existing in the whitelist; and identifying, by one or more processors, a web domain that is associated with information that matches the identified information associated with the registered owner of the web domain existing in the whitelist.

5. The method of claim 1, wherein identifying candidates for the whitelist further comprises:

identifying, by one or more processors, a hyperlink included in a web domain existing in the whitelist; and identifying, by one or more processors, one or more candidates for the whitelist by accessing the identified hyperlink and using the web crawler to navigate to additional web domains.

6. The method of claim 5, further comprising:
determining, by one or more processors, whether to access the identified hyperlink based on defined preferences, wherein the preferences include an indication of preferred file extensions; and
responsive to determining to access the identified hyperlink, accessing, by one or more processors, the identified hyperlink utilizing the web crawler.

7. The method of claim 4, wherein identifying information associated with a registered owner of a web domain existing in the whitelist further comprises:
accessing, by one or more processors, a database to retrieve information associated with the registered owner of the web domain existing in the whitelist.

8. A computer program product for updating a whitelist, the computer program product comprising:
one or more non-transitory computer readable tangible storage media and program instructions stored and retained on at least one of the one or more non-transitory computer readable tangible storage media, the program instructions readable/executable by one or more computer processors and further comprising:
program instructions, stored and retained on at least one of the one or more computer readable tangible storage media and executable by the one or more computer processors, to identify candidates for a whitelist based on correlations between candidates and web domains existing in the whitelist;
program instructions, stored and retained on at least one of the one or more computer readable tangible storage media and executable by the one or more computer processors, to extract information from the candidates for the whitelist, wherein the extracted information includes textual information and image information;
program instructions to classify the candidates for the whitelist into one or more groups of candidates based on a comparison of the extracted information from the candidates for the whitelist and information associated with the web domains existing in the whitelist;
program instructions to determine one or more groups of candidates to add to the whitelist based upon a similarity measure ranking between the web domains existing in the whitelist and the candidates for a whitelist;
the determining the one or more groups of candidates to add to the whitelist including:
finding and locating new domains and URLs that are candidates for the whitelist using a whitelist update program enabled by a locator subprogram of the whitelist update program, as part of the determining the one or more groups of candidates to add to the whitelist;
systematically browsing the World Wide Web using a web crawler sub program of the locator;
validating hyperlinks and Hyper Text Markup Language (HTML) code using the web crawler sub program of the locator;
storing visited websites in a database using the locator;
analyzing the previously visited pages using the whitelist update program accessing the database, using one or more processors, as part of the determining the one or more groups of candidates to add to the whitelist; and
program instructions to update the whitelist to include the determined one or more groups of candidates.

9. The computer program product of claim 8, wherein the identified candidates for the whitelist are candidates selected from the group consisting of:
an email address list, a domain name representing an internet protocol resource list, a media access control address list, and a local area network list.

10. The computer program product of claim 8, wherein identifying candidates for the whitelist further comprises program instructions, stored on the one or more computer readable storage media, which when executed by a processor, cause the processor to:
identify an owner associated with a web domain existing in the whitelist; and
identify a web domain that is associated with the owner that is associated with the web domain existing in the whitelist.

11. The computer program product of claim 8 wherein identifying candidates for the whitelist further comprises program instructions, stored on the one or more computer readable storage media, which when executed by a processor, cause the processor to:
identify information associated with a registered owner of a web domain existing in the whitelist; and
identify a web domain that is associated with information that matches the identified information associated with the registered owner of the web domain existing in the whitelist.

12. The computer program product of claim 8, wherein identifying candidates for the whitelist further comprises program instructions, stored on the one or more computer readable storage media, which when executed by a processor, cause the processor to:
identify a hyperlink included in a web domain existing in the whitelist; and
identify one or more candidates for the whitelist by accessing the identified hyperlink and using the web crawler to navigate to additional web domains.

13. The computer program product of claim 8 further comprising program instructions, stored on the one or more computer readable storage media, which when executed by a processor, cause the processor to:
determine whether to access the identified hyperlink based on defined preferences, wherein the preferences include an indication of preferred file extensions; and
responsive to determining to access the identified hyperlink, access the identified hyperlink utilizing the web crawler.

14. The computer program product of claim 11 wherein identifying information associated with a registered owner of a web domain existing in the whitelist further comprises program instructions, stored on the one or more computer readable storage media, which when executed by a processor, cause the processor to:
access a database to retrieve information associated with the registered owner of the web domain existing in the whitelist.

15. A computer system comprising:
one or more computer processors;
one or more non-transitory computer readable storage media; and
program instructions stored and retained on the non-transitory computer readable storage media for execution by at least one of the one or more computer processors, the program instructions comprising:

program instructions, stored and retained on the computer readable storage media and executable by at least one of the one or more processors, to identify candidates for a whitelist based on correlations between candidates and web domains existing in the whitelist;

program instructions to, stored and retained on the computer readable tangible storage media and executable by at least one of the one or more processors, extract information from the candidates for the whitelist, wherein the extracted information includes textual information and image information;

program instructions to classify the candidates for the whitelist into one or more groups of candidates based on a comparison of the extracted information from the candidates for the whitelist and information associated with the web domains existing in the whitelist;

program instructions to determine one or more groups of candidates to add to the whitelist based upon a similarity measure ranking between the web domains existing in the whitelist and the candidates for a whitelist;

the determining the one or more groups of candidates to add to the whitelist including:

finding and locating new domains and URLs that are candidates for the whitelist using a whitelist update program enabled by a locator subprogram of the whitelist update program, as part of the determining the one or more groups of candidates to add to the whitelist;

systematically browsing the World Wide Web using a web crawler sub program of the locator;

validating hyperlinks and Hyper Text Markup Language (HTML) code using the web crawler sub program of the locator;

storing visited websites in a database using the locator;

analyzing the previously visited pages using the whitelist update program accessing the database, using one or more processors, as part of the determining the one or more groups of candidates to add to the whitelist; and program instructions to update the whitelist to include the determined one or more groups of candidates.

16. The computer system of claim 15, wherein the identified candidates for the whitelist are candidates selected from the group consisting of: an email address list, a domain name representing an internet protocol resource list, a media access control address list, and a local area network list.

17. The computer system of claim 15, wherein identifying candidates for the whitelist further comprises program instructions, stored on the one or more computer readable storage media, which when executed by a processor, cause the processor to:

identify an owner associated with a web domain existing in the whitelist; and identify a web domain that is associated with the owner that is associated with the web domain existing in the whitelist.

18. The computer system of claim 15 wherein identifying candidates for the whitelist further comprises program instructions, stored on the one or more computer readable storage media, which when executed by a processor, cause the processor to:

identify information associated with a registered owner of a web domain existing in the whitelist; and identify a web domain that is associated with information that matches the identified information associated with the registered owner of the web domain existing in the whitelist.

19. The computer system of claim 15 wherein identifying candidates for the whitelist further comprises program instructions, stored on the one or more computer readable storage media, which when executed by a processor, cause the processor to:

identify a hyperlink included in a web domain existing in the whitelist; and identify one or more candidates for the whitelist by accessing the identified hyperlink and using the web crawler to navigate to additional web domains.

20. The computer system of claim 15 further comprising program instructions, stored on the one or more computer readable storage media, which when executed by a processor, cause the processor to:

determine whether to access the identified hyperlink based on defined preferences, wherein the preferences include an indication of preferred file extensions; and responsive to determining to access the identified hyperlink, access the identified hyperlink utilizing the web crawler.

* * * * *